Sept. 20, 1966     C. C. WILLERT ETAL     3,273,837
PLASTIC PIPE HANGER
Filed June 23, 1965
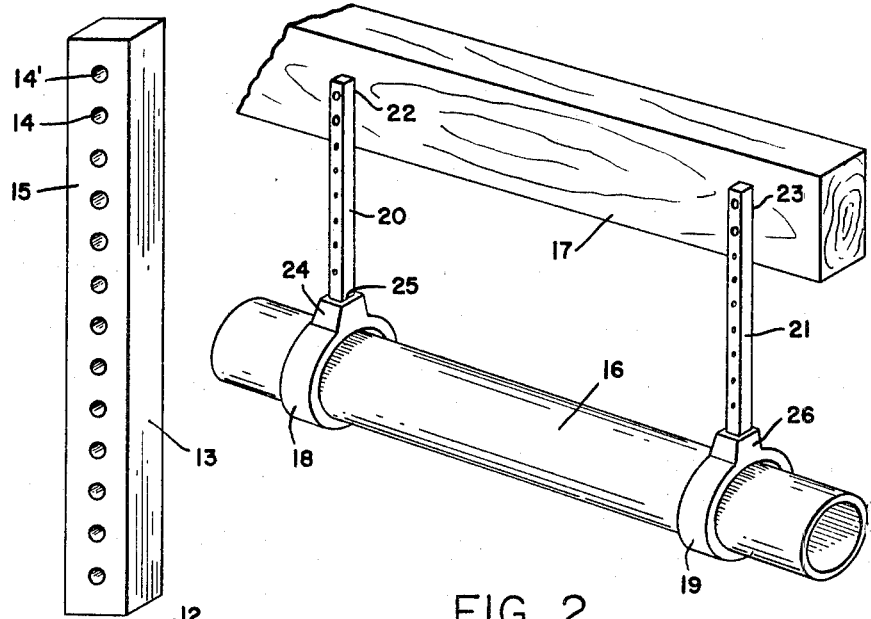
FIG_2
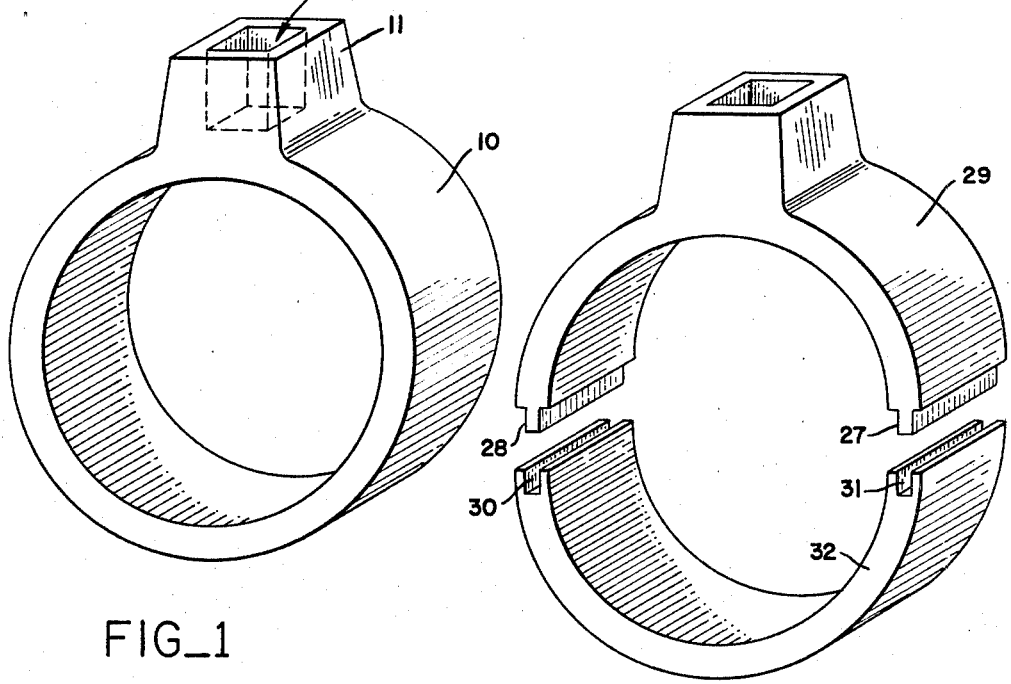
FIG_1
FIG_3
INVENTORS
CLARENCE C. WILLERT
BY RUSSELL F. HENRIKSEN
*Townsend & Townsend*
ATTORNEYS United States Patent Office 3,273,837
Patented Sept. 20, 1966

3,273,837
PLASTIC PIPE HANGER
Clarence C. Willert and Russell F. Henriksen, Walnut Creek, Calif., assignors to Willert and Henriksen, Walnut Creek, Calif.
Filed June 23, 1965, Ser. No. 466,260
8 Claims. (Cl. 248—59)

This invention relates to a means and a method for installing light-weight plastic pipes in a building, such as those found suspended under the typical single family residence.

Metal pipes (galvanized steel, cast iron, and copper) have to date been the prevalent type of material used in plumbing dwellings and other buildings. In suspending the metallic type of piping it is conventional to use a type of material known as "plumber's tape" which comprises an elongate strip of flexible metal with a plurality of closely spaced holes therealong. The tape is cut to size and nailed to the supporting structural member at its ends with the pipe being cradled in the center of the section of tape utilized.

Recently, light-weight plastic pipe has been introduced with the trend towards ever increasing quantities of the plasic materials as a replacement for the older metal piping. The plastic has been shown to be quite satisfactory in all respects and has advantages as a substitute for the metal in many jobs. One advantage of the plastic pipe is its relatively light weight which enables the plumber and construction worker to handle large quantities of it with ease. At the same time, this lightweight characteristic of the plastic has created a problem in properly suspending it from the structural member of the building. The pipe is so light that it tends to float upwardly, especially when empty, from the bottom of the cradle formed by plumber's tape. Other suspension techniques are, therefore, required.

In addition, plastic pipe tends to sag and therefore needs relatively more closely spaced supporting members. For example, a two inch plastic pipe should be supported at four foot intervals in most cases. A typical installation would therefore require a great many supporting members which quickly rule out the relatively expensive machined metal brackets that might otherwise have provided the necessary support in both the up and down directions.

The present invention provides in essence a plastic rod and ring combination that meets all of the needs for hanging the new types of light-weight plastic pipes. The combination of parts of this invention lends support to the pipe in all directions including both upwardly and downwardly relative to the ground. Moreover, and as will be described in more detail hereinafter, the rod and ring members are selected from plastics which make possible a simple on site method of installation in which the rod member can be cut to size as needed during the installation process to obtain the proper spacing of the pipe from the supporting joists.

In a preferred embodiment of the invention a loose fitting plastic ring is installed around the plastic pipe. The ring has a square slot formed in the outer surface. A plastic rod is provided which has a mating square cross section for the slot. The rod has a series of spaced apart holes therethrough along a pair of parallel sides. The rod is cut from a long length of plastic on site for proper spacing between the joist and the plastic pipe. One end of the rod is nailed to the joist through the preformed holes. The other end of the rod is inserted in the slot of the ring that has been installed around the pipe. The rod and ring are chosen from plastics that can be bonded at room temperature by applying a suitable solvent cement or adhesive material to the slot and/or rod end.

It is important to employ a plastic rod material having a square or rectangular cross section or at least material having two flat parallel sides through which the spaced apart holes may be preformed. This is necessary to provide a surface that can be placed against the flat surface of the joist member for nailing. Where the square cross section is employed, maximum flexibility for the installing plumber is obtained. With the square configuration, the installing plumber can rotate the rod in any direction convenient for resting upon the surface of the supporting joist and be assured that the lower end of the rod will mate with the slot in the ring or annular member that is disposed around the plastic pipe. The square rod also provides uniform strength in all directions.

The rod and annular member are preferably formed from plastic of the type that permits a rapid room temperature bond to be formed between component parts on job site. As a result, the installing worker upon cutting the rod to appropriate size can insert it in the ring slot, form the bond and rapidly move on to the next location of the pipe that needs support. A preferred material for the parts utilized in this invention is acrylonitrile-butadiene-styrene polymers that are now widely used in forming the plastic pipe itself. This material is advantageous in that there are commercially available solvent cements which, when applied to the surface of the acrylonitrile-butadiene-styrene polymer and contacted with another similarly treated section of the polymer, will form a rapid ambient or room temperature bond that is as strong as the remainder of the basic plastic members. These properties lend themselves to the formation of the bond between the rod and ring.

In forming the ring for placement around the plastic pipe, it is also important to form the ring with an internal diameter slightly larger than the external diameter of the pipe so that the ring fits in a loose sliding relationship with the outer surface of the pipe. This provides for thermodynamic expansion and contraction of the plastic pipe during use. The importance of this will be appreciated when it is considered that the pipe may at one moment be at an ambient temperature of 60° F. and shortly thereafter be subjected to drain water at temperatures greatly in excess of 100° F. The plastic pipe will change longitudinal and circumferential dimensions when contacted with the hot water and again after cooling down. The present rings are designed to anticipate and accommodate this change in pipe dimensions.

In the accompanying drawings:

FIG. 1 shows, in perspective, a ring and rod suitable for use in the present invention;

FIG. 2 shows, in side elevation, the manner of suspending a section of plastic pipe from a joist with a pair of rod and ring members of this invention; and FIG. 3 shows an alternate embodiment for the ring of FIGS. 1 and 2.

With reference to FIG. 1, the annular member or ring 10 is formed from a suitable plastic such as acrylonitrile-butadiene-styrene. At one portion a neck 11 projects outwardly therefrom. Neck 11 is formed with a square slot 12 therein. A square rod 13 preferably of the same type of plastic material as ring 10 is formed to have a square cross section which mates with and fits within square slot 12. Square rod 13 has a plurality of spaced apart holes therethrough such as holes 14 and 14' along one flat surface 15. Holes 14 and 14' extend through rod 13 to a flat surface (not shown) parallel to surface 15.

FIG. 2 shows a method of utilizing the components of FIG. 1. A section of plastic pipe 16 is suspended from a suitable structural member such as joist 17. A pair of rings 18 and 19 are disposed around pipe 16 and are spaced apart at intervals suitable to prevent a sag in pipe 16 between rings 18 and 19. If it is assumed that a slope in pipe 16 is desired, such as a typical quarter inch per foot drop which might be utilized in drainage pipes of a typical dwelling, rods 20 and 21 will be cut to different lengths if joist 17 is level. Both rods 20 and 21 may be conveniently cut from a single long length of square rod on site as determined by the installing plumber and depending upon the type of drop or installation involved.

As illustrated in FIG. 2 rod 20 is cut and nailed to joist 17 at 22 through the two end holes in rod 20 while rod 21 is cut and nailed to joist 17, at 23 through its two end holes. The cuts are made so that rod 20 just meets neck 24 of ring 18 and fits within solt 25 therein. Rod 21 is similarly cut to meet with neck 26 of ring 19. At this time the installing plumber need only apply a suitable solvent cement or adhesive to the lower ends of rods 20 and 21 and/or to the slots within necks 25 and 26, and insert rods 20 and 21 therein. Where the materials are properly selected, the bond will occur at ambient or room temperature in a short time and permit progress to other sections of the pipe.

The above method is illustrative of the techniques suitably utilized for new work. Where installation is to be undertaken with respect to an old pipe, a modification of ring 10 may be required. In this event ring 10 may be formed in two parts as illustrated in FIG. 3.

With the structure illustrated in FIG. 3 projections 27 and 28 of upper ring portion 29 fit within the recesses 30 and 31 of lower ring portion 32. Preferably upper and lower portions 29 and 32 are formed from plastics that can be readily bonded to each other at room temperature with a suitable solvent cement or adhesive in the same manner that rod 13 is bonded in slot 12 of ring 10. In this case it is simply a matter of placing one-half of the split ring around the pipe to be suspended, applying a solvent cement or adhesive as required to the junction area between ring portions 29 and 32, and then placing the remaining section of the ring around the pipe and into bonding relation with the section that has been already installed. From that point on suspension of the pipe follows the techniques described above.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A hanger for light-weight plastic pipe comprising: an annular plastic member for placement about the circumference of said pipe, said annular member having an inside diameter slightly larger than the outer diameter of the pipe for a loose slidable fit therebetween to allow for thermodynamic expansion and contraction of the pipe, a plastic rod having at least one pair of flat parallel sides, a series of spaced apart apertures through said rod along said pair of flat sides, and a recess in said annular member mating with the cross sectional area of said rod, said rod and annular member being initially separate but formed from plastic that is mutually chemically bondable at ambient temperature.

2. A hanger in accordance with claim 1 wherein said rod is square with holes along one pair of parallel sides to receive nails therethrough for attachment of the rod to a joist, and wherein said annular member has a square recess for mating with said rod.

3. A hanger in accordance with claim 1 wherein said annular member is formed in two parts from plastic of the type that is mutually bondable at ambient temperature to form a unitary structure around a pipe.

4. A hanger in accordance with claim 1 wherein said annular member and rod are formed from an acrylonitrile-butadiene-styrene polymer.

5. A suspension means for a pipe comprising: a plastic ring having a rectangular recess in the outer surface thereof, a cooperatively-shaped rectangular plastic rod having spaced apart holes through one pair of parallel sides, one end of said rod being bonded in said recess, the other end of said rod being nailable to a joist through said spaced apart holes.

6. The combination in accordance with claim 5 wherein said ring recess and rod have a square cross section.

7. The combination in accordance with claim 5 wherein said rod and plastic ring are formed from an acrylonitrile-butadiene-styrene polymer and the rod is bonded in said recess with a solvent cement that creates the bond at ambient temperature.

8. A method for suspending plastic pipe from building joists comprising: providing a section of light-weight plastic pipe, placing loose fitting plastic rings around said pipe at preselected spaced apart locations, each ring having a square recess in the outer surface thereof, orienting said rings so that the square recess of each ring faces a joist, temporarily supporting said pipe at a desired distance below said joists, providing a length of square plastic rod, said rod having spaced apart nail holes therethrough along one pair of parallel sides, nailing one end of said rod through said holes to a joist, cutting the rod to just fit in the square recess of a ring positioned directly below the joist to which the rod is nailed, applying chemical bonding means to the recess and adjacent rod end, and inserting the adjacent rod end in said recess, said bonding means being selected to cause an ambient temperature bond between the plastic of said rod and ring.

References Cited by the Examiner

UNITED STATES PATENTS

| | | | |
|---|---|---|---|
| 1,315,890 | 9/1919 | Wheeler | 248—59 |
| 2,229,129 | 1/1941 | Reigelman | 248—62 |
| 2,339,992 | 1/1944 | Hohmeister | 248—62 |
| 2,539,783 | 1/1951 | Kirk | 248—62 |
| 2,762,592 | 9/1956 | Adams | 248—59 |
| 2,999,661 | 9/1961 | Shuter | 248—62 |
| 3,009,220 | 11/1961 | Fein | 248—74 X |

CLAUDE A. LE ROY, *Primary Examiner.*